(12) United States Patent  (10) Patent No.: US 9,197,254 B2
Trotta et al.  (45) Date of Patent: Nov. 24, 2015

(54) TRANSMITTER AND METHOD OF OPERATING A TRANSMITTER

(75) Inventors: Saverio Trotta, Munich (DE); Hao Li, Poing (DE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 59 days.

(21) Appl. No.: 13/979,857

(22) PCT Filed: Jan. 21, 2011

(86) PCT No.: PCT/IB2011/050280
§ 371 (c)(1),
(2), (4) Date: Jul. 16, 2013

(87) PCT Pub. No.: WO2012/098438
PCT Pub. Date: Jul. 26, 2012

(65) Prior Publication Data
US 2013/0288622 A1 Oct. 31, 2013

(51) Int. Cl.
*H04B 1/04* (2006.01)
*H04B 1/036* (2006.01)

(52) U.S. Cl.
CPC . *H04B 1/04* (2013.01); *H04B 1/036* (2013.01)

(58) Field of Classification Search
USPC ............ 455/69, 522, 91, 115.1, 127.1, 127.2, 455/127.3, 226.1; 375/295, 296
See application file for complete search history.

(56) References Cited

U.S. PATENT DOCUMENTS

| 6,815,643 | B2 | 11/2004 | Der Ropp |
| 7,546,137 | B2 | 6/2009 | D'Hont et al. |
| 8,670,729 | B2 * | 3/2014 | Behzad ...................... 455/115.1 |
| 2003/0040290 | A1 | 2/2003 | Sahlman et al. |
| 2004/0137852 | A1 | 7/2004 | Shi et al. |
| 2006/0126754 | A1 * | 6/2006 | Filimonov et al. ............ 375/296 |

FOREIGN PATENT DOCUMENTS

JP 2005348130 A 12/2005

OTHER PUBLICATIONS

International Search Report and Written Opinion correlating to PCT/IB2011/050280 dated Oct. 25, 2011.

* cited by examiner

*Primary Examiner* — Thanh Le

(57) ABSTRACT

A transmitter is provided that comprises an oscillator, a power amplifier, and a heating element. The power amplifier generates a high power signal according to the low power signal. The transmitter may be operated such that a heat production rate of the group consisting of the power amplifier and the heating element is substantially constant. The heating element may be a dummy power amplifier. A method of operating a transmitter is also disclosed.

20 Claims, 3 Drawing Sheets

TRANSMITTER AND METHOD OF OPERATING A TRANSMITTER

FIELD OF THE INVENTION

This invention relates to a transmitter and a method of operating a transmitter.

BACKGROUND OF THE INVENTION

FIG. 1 schematically illustrates an example of an embodiment of a radio transmitter 10. Transmitter 10 may, for example, be a radar transmitter or a transmitter of a mobile communication unit such as a mobile phone. In the shown example, transmitter 10 comprises an oscillator 12, a voltage amplifier 18, and a power amplifier 24.

The oscillator 12 may generate an oscillatory low power signal 14, 16. The low power signal 14, 16 may for example be a differential signal, e.g. provided by the difference between a first voltage 14 and a second voltage 16 output by the oscillator 12.

The voltage amplifier 18 may be coupled between the transmitter 12 and the power amplifier 24. The voltage amplifier 18 may for example be an individual amplifier or comprise an amplifier chain. The voltage amplifier 18 may amplify the low power signal 14, 16 to generate a corresponding low power signal 20, 22. The low power signal 20, 22 may be fed to the power amplifier 24. The power amplifier 24 may generate a high power signal 26, 28 according to the low power signal 20, 22 and, thus, according to the low power signal 14, 16. Here and throughout this application, "according to" means "as a function of at least" or "based at least on". The high power signal 26, 28 may be fed for example to an antenna (not shown) to emit an electromagnetic wave, or to some other load (not shown). The oscillator 12 may comprise a phase-locked loop (PLL) (not shown) comprising, for example, a voltage controlled oscillator (VCO) (not shown).

Power amplifier 24 may be controlled by, and responsive to a power control signal 32. For example, power control signal 32 may be a binary signal, comprising first values and second values. The first and second values may, for example, be high and low values, respectively. For example, power amplifier 24 may be energized in response to the power control signal 32 assuming the first value and be energized (powered off) in response to the power control signal 32 assuming the second value. The power control signal 32 may be a pulse width modulated (PWM) signal. Power amplifier 24 may thus be operated for example at an average power that is e.g. proportional to a duty cycle of the power control signal 32. A duty cycle of zero may correspond to zero output power. A duty cycle of one may correspond to maximum output power. Alternatively, power control signal 32 may be an analogue signal.

The total power consumed by the power amplifier 24 may for example be a sum of e.g. a DC operating power and an AC output power. The DC operating power may be required to operate the internal electronics of the power amplifier. The AC output power may be transferred to the antenna or other load, if connected. For example, when the high power signal 26, 28 is not fed to any load, i.e. when no load is connected, the AC output power may be zero. The AC output power may also depend on the amplitude of the low power signal 20, 22. In contrast, the DC operating power consumed by the power amplifier 24 may be largely independent of the amplitude of the oscillatory signal (low power signal 20, 22 in the example) that is fed to the power amplifier 24. The DC operating power may be converted into thermal energy in the power amplifier 24. In other words, the power amplifier 24 may generate heat. The heat may be dissipated over the entire transmitter 10. In particular, a temperature of the oscillator 12 may rise. This may cause an undesired frequency drift, because the oscillation frequency of the oscillator 12 may generally depends on the temperature of the oscillator 12. In particular, semiconductor-based oscillators can be very sensitive to temperature. For example, a millimeter-wave VCO, e.g. a 77-GHz VCO, may have a frequency drift of −20 MHz per Kelvin (K). Although in many situations, thermal effects can be fairly slow compared to e.g. electrical phenomena, it has been observed that the oscillation frequency of the oscillator 12 may be affected even when the power amplifier 24 is switched on and off at relatively high frequencies, e.g. above 10 Hz or even above 1 kHz, e.g. when the power amplifier 24 is controlled using PWM. In other words, the oscillator 12 may be sensitive to temperature fluctuations that occur over short periods, e.g. shorter than a millisecond.

U.S. Pat. No. 6,815,643 B2 (Von der Ropp) describes a semiconductor device in which an integrated circuit executes dummy operating cycles in order to generate heat if the temperature of the semiconductor device drops below a lower limit value.

SUMMARY OF THE INVENTION

The present invention provides a transmitter and a method of operating a transmitter as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Figure 1:
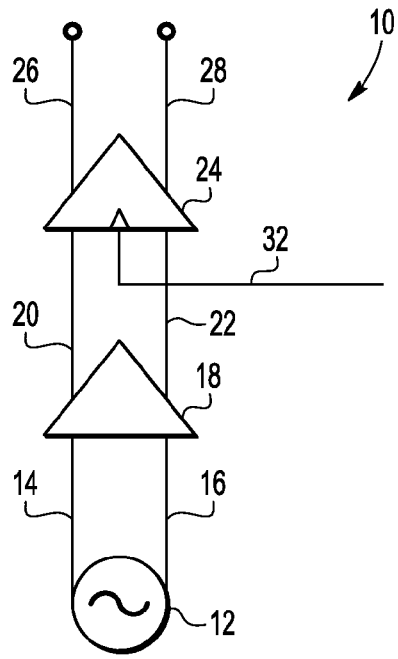
FIG. 1 schematically shows an example of an embodiment of a transmitter.
Figure 2:
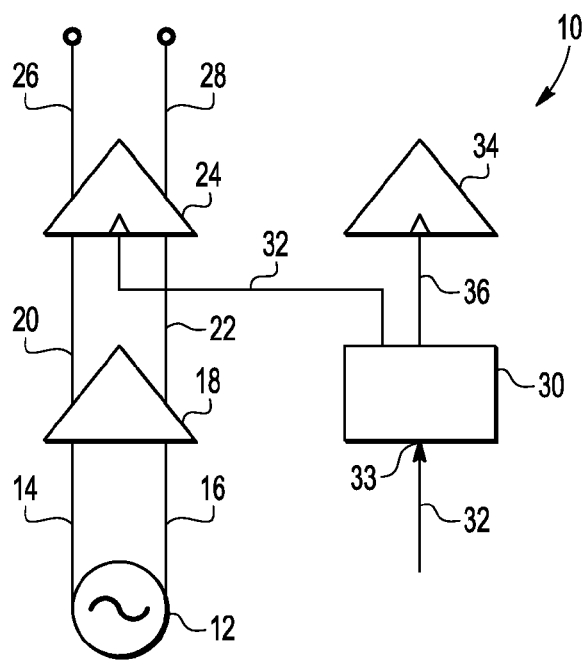
FIG. 2 schematically shows an example of another embodiment of a transmitter.

Referring now to FIG. 2, an example of a transmitter 10 is shown. Transmitter 10 may comprise, for example, an oscillator 12, a voltage amplifier 18, and a power amplifier 24. Oscillator 12, voltage amplifier 18, and power amplifier 24 may be arranged for example as described above with reference to FIG. 1. Transmitter 10 may further comprise a heating element 34. The transmitter 10 may be operable such that a combined heat production rate of the group 24, 34 consisting of the power amplifier 24 and the heating element 34 is substantially constant. Substantially constant means that such frequency variations in the oscillatory low power output signal 14, 16 generated by the oscillator which are due to the power amplifier 24 being energized/deenergized, are reduced as compared to the transmitter 10 shown in FIG. 1. Constant means stationary or constant in time over any period of practical interest. In other words, the heating element 30 may be arranged to at least partially or completely compensate for variations in the heat produced by the power amplifier 24. For example, each of the power amplifier 24 and the heating element 34 may have two operating modes, namely ON and OFF, in which it is energized/deenergized respectively. A substantially constant heat production rate may thus be achieved by switching heating element 34 on when power amplifier 24 is switched off, and vice versa. For example, the heating element 34 may be arranged to be switched on/off in response to the power amplifier 24 being switched off/on. The heating element 34 may, for example, be a dummy power amplifier, that is, a device which is identical in construction to power amplifier 24. This may ensure that power amplifier 24 and heating element 34 have approximately or identically the same heat production rate when operated under the same conditions, e.g. using the same DC operating voltage, or e.g. using the same DC operating current. Alternatively, heating element 34 may for example be electro-thermal transducer which converts electrical energy into heat, e.g, a resistor or other suitable heat producing element.

The power amplifier 24 and the heating element 34 may be arranged at similar distances from the oscillator 12. They may, in particular, be arranged adjacent to each other or in an overlapping manner or in an interlaced manner. This may ensure firstly that they may usually have similar temperatures, as they may heat each other, and secondly it may ensure that they may have similar heat propagation paths relative to the oscillator 12.

The transmitter 10 may for example be implemented in form of a chip mounted on a radio frequency board. The radio frequency board may notably be a radio frequency (RF) board that lacks a dedicated heat dissipating element, i.e. an RF board that does not comprise a dedicated heat dissipating element such as e.g. a metal plate, e.g an aluminium plate.

The transmitter 10 may further comprises a controller 30. The controller 30 may for example provide a first power control signal 32 to the power amplifier 24 and a second power control signal 36 to the heating element 34. The controller 30 may thus control the power amplifier 24 and the heating element 34 such that their combined heat production rate is stationary. The combined heat production rate may be controlled to be stationary, in particular when the power amplifier is switched on or off. Transmitter 10 may receive the first power control signal 32 via an input terminal 33. The first power control signal 32 may be received from an external device, e.g. from another controller or from some other component (not shown) integrated in the transmitter 10. More generally, the transmitter 10 may be operable to receive one of the first power control signal 32 and second power control signal 36 via an input terminal. The first power control signal 32 and the second power control signal 36 may be analogue or binary signals. In either case, the first power control signal 32 and second power control signal 36 may be complementary to each other. This means that the sum of their amplitudes is constant (in the case of analogue signals), or that one is the inverse of the other (in the case of binary signals). The first power control signal 32 and second power control signal 36 may be periodic. For example, they may have a frequency greater than 10 Hz or greater than 1 kHz or even greater than one MHz. For example, they may be pulse-width modulated signals.

Figure 3:
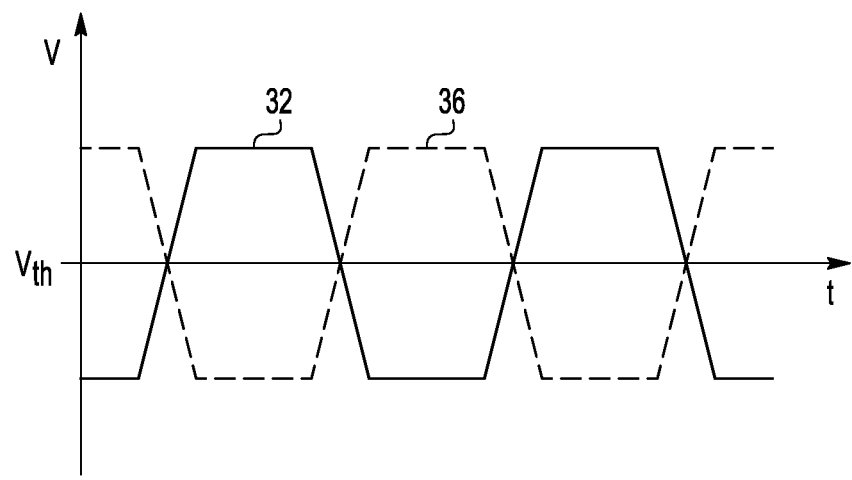
FIG. 3 schematically shows an example of an embodiment of a first power control signal and a second power control signal.

FIG. 3 illustrates by way of example a first power control signal 32 and a second power control signal 36. For example, first power control signal 32 and a second power control signal 36 may be fed to the power amplifier 24 and to the heating element 34, respectively. A signal is generally a time-dependence of a physical quantity. For example, the first power control signal 32 may be a voltage V provided at a power control input of the power amplifier 24. The second power control signal 36 may, for example, be a voltage provided at a power control input of the heating element 34. In the figure, the voltage providing the first power control signal 32 and the voltage providing the second power control signal 36 are plotted as functions of time t.

The power amplifier 24 may, for example, be arranged to be powered/powered off in response to the first power control signal 32 exceeding/falling below a first threshold ($V_{TH}$ in the figure). The heating element 34 may, for example, be arranged to be powered/powered off in response to the second power control signal 36 exceeding/falling below a second threshold ($V_{TH}$ in the figure). In the shown example, the first threshold and the second threshold are the same. More generally, however, the first threshold and the second threshold may differ; in this case, there may be an additional offset (in the example, a voltage offset) between the first power control signal 32 and the second power control signal 36. For example, the second power control signal 36 may be shifted along the V axis relative to the first power control signal 32.

The first power control signal 32 may have a defined duty cycle D1. The second power control signal 36 may furthermore be designed to have a duty cycle D2, e.g. such that D1 plus D2 equals 1. In the figure, D1 equals 0.5 and D2 equals 0.5.

Figure 4:
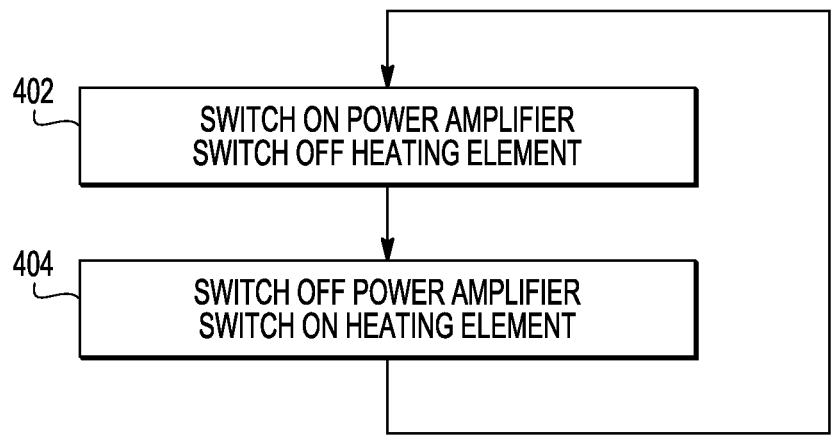
FIG. 4 shows a schematic flow chart of an example of an embodiment of a method of operating a transmitter.

FIG. 4 illustrates, in a schematic and simplified manner, a method of operating a transmitter. The method may comprise: providing an oscillator for generating an oscillatory low power signal; providing a power amplifier for generating a high power signal according to the low power signal; and operating a heating element such that a heat production rate of the group consisting of the power amplifier and the heating element remains substantially constant. The oscillator, the low power signal, the power amplifier, the high power signal, and the heating element may, for example, be the oscillator 12, the low power signal 14, 16, the power amplifier 24, the high power signal 26, 28, and the heating element 34, respectively, which have been described above in reference to FIGS. 1 and 2. The combined heat production rate of the power amplifier and the heating element may be maintained substantially constant as follows.

402 the power amplifier 24 is powered, while the heating element 34 is powered off. For example, the power amplifier 24 may be connected to a DC operating voltage provider, while the heating element 34 may be disconnected from a heating voltage provider. The heating voltage provider and the DC operating voltage provider may be the same. For example, the heating voltage provider and the DC operating voltage provider may be provided by a common voltage supply or by a common terminals. Thus the heat production rate of the power amplifier and of the heating element may be equally affected by possible variations in e.g. a supply voltage. The power amplifier 24 may be powered, for example, in response to the first power control signal 32 exceeding a first threshold, e.g. a first voltage value. The heating element 34 may be powered off, for example, in response to the second power control signal 36 falling below a second threshold, e.g. a second voltage value.

Subsequently at 404, the power amplifier 24 is powered off, while the heating element 34 is powered. For example, the power amplifier 24 may be powered off in response to the first power control signal 32 falling below the first threshold. The heating element 34 may be powered, for example, in response to the second power control signal 36 exceeding the second threshold.

The process may then return to 402.

Figure 5:
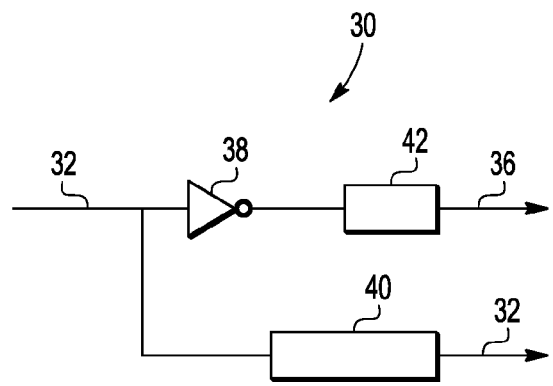
FIG. 5 schematically shows an example of an embodiment of a controller.

Referring now to FIG. 5, an example embodiment of a controller 30 is illustrated in a schematic and simplified manner. The controller 30 may, for example, be used as the controller 30 shown in FIG. 2. The controller 30 shown in present FIG. 5 comprises an inverter 38, for inverting one of the first power control signal 32 and second power control signal 36. In the present example, the inverter 38 is arranged to invert the first power control signal 32. The controller 30 may comprise one or more delay elements for delaying the first power control signal 32 and second power control signal 36 relative to each other. In the shown example, the controller 30 comprises a first delay element 40 for delaying the first power control signal 32. The controller 30 may further comprise a second delay element 42 for delaying the second power control signal 36. The delay produced by the first delay element 40 may be equal, for example, to the combined delay produced by the inverter 38 and the second delay element 42. Alternatively, the delay produced by the first delay element 40 may be substantially equal to the delay produced by the inverter 38. The first delay element 40, or the second delay element 42, or both may be dimensioned so as to compensate for a difference between an intrinsic delay of the power amplifier 24 and an intrinsic delay of the heating element 34. In this context, an intrinsic delay is a delay between the device in question (i.e. the power amplifier 24 or the heating element 34) receiving a power control signal (e.g. the first power control signal 32 or the second power control signal 36) and energizing/deenergizing the device accordingly.

Figure 6:
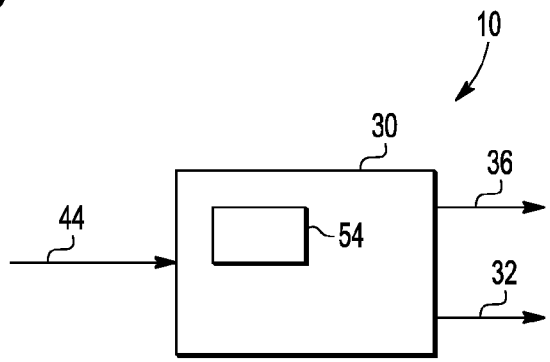
FIG. 6 schematically shows another example of an embodiment of a controller.

Referring now to FIG. 6, a schematic representation of an example embodiment of a controller 30 is shown. The controller 30 may be used as the controller of the transmitter 10 shown in FIG. 2. The controller 30 may be operable, for example, to receive a duty cycle signal 44 and to set a duty cycle of the first power control signal 32 and a duty cycle of the second power control signal 36 in response to the received duty cycle signal 44. The duty cycle signal 44 may be indicative of a desired duty cycle. For example, the controller 30 may be arranged to set the duty cycle of the first control signal 32 and the duty cycle of the second control signal 36 such that their sum equals 1. The controller 30 may further comprise a delay element 54 delaying the first power control signal 32 and the second power control signal 36 relative to each other.

Figure 7:
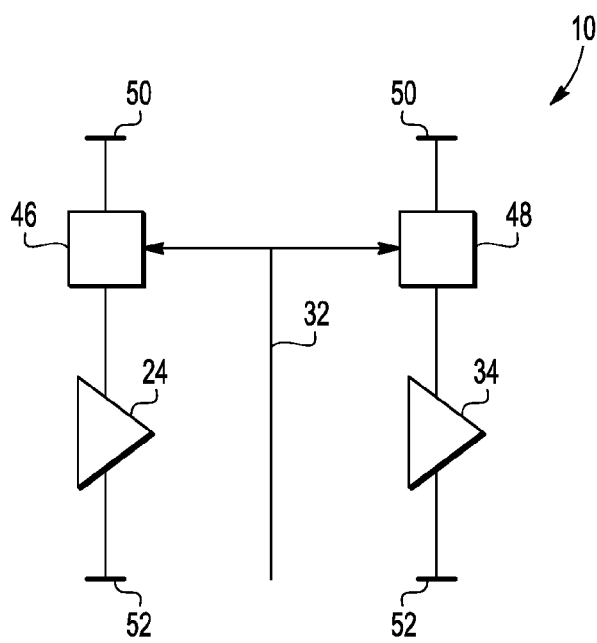
FIG. 7 schematically shows an example of an embodiment of a first power switch and a second power switch in a transmitter.

Referring now to FIG. 7, an example embodiment of a transmitter 10 is illustrated in a simplified and schematic manner. The transmitter 10 shown in the figure comprises, in addition to the power amplifier 24 and the heating element 34 described above with reference to FIG. 2, a first power switch 46 for energizing and deenergizing the power amplifier 24 and a second power switch 48 for energizing and deenergizing the heating element 34. The first power switch 46 and the second power switch 48 may be complementary to each other. In other words, the first power switch 46 and the second power switch 48 may be arranged to energize the heating element 34 when and only when the power amplifier 24 is deenergized. For example, the first power switch 46 may be arranged to provide a DC operating voltage to power amplifier 24, for example, in response to a power control signal 32 exceeding a first threshold. The second power switch 48 may, for example, be arranged to apply a heating voltage to the heating element 34, for example, in response to the power control signal 32 falling below a second threshold. The first threshold and the second threshold may be the same. The DC operating voltage applied to the power amplifier 24 and the heating voltage applied to the heating element 34 may, for example, be the same. For example, the DC operating voltage and the heating voltage may be provided by supply terminals 50 and 52.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, delay element 40 may be merged with power amplifier 24. Inverter 38 and delay element 42 may be merged with heating element 36.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, controller 30 may be located within the same device as power amplifier 24 and heating element 36. Alternatively, the examples may be implemented as any number of separate integrated circuits or separate devices interconnected with each other in a suitable manner. For example, controller 30 may be located on a different chip as power amplifier 24 and heating element 36.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A transmitter, comprising
    an oscillator for generating an oscillatory low power signal;
    a power amplifier for generating a high power signal according to the low power signal;
    a heating element, wherein the transmitter is operable such that a heat production rate of the group consisting of the power amplifier and the heating element is substantially constant; and
    a controller ured to ovide a first power control si sal to the power amplifier and a second power control signal to the heating element.

2. The transmitter as set forth in claim 1, wherein the heating element comprises a dummy power amplifier.

3. The transmitter as set forth in claim 1 configured to receive one of the first and second power control signals via an input terminal.

4. The transmitter as set forth in claim 1, wherein the first and second power control signals are complementary to each other.

5. The transmitter as set forth in claim 1 wherein the first and second power control signals are binary signals.

6. The transmitter as set forth in claim 1, wherein the controller is configured to generate the second power control signal from the first power control signal.

7. The transmitter as set forth in claim 1, wherein the controller comprises one or more delay elements configured to delay the first and second power control signals relative to each other.

8. The transmitter as set forth in claim 1, wherein the controller comprises an inverter configured to invert one of the first and second power control signals.

9. The transmitter as set forth in claim 1, wherein the controller is configured to set a duty cycle of the first control signal and a corresponding duty cycle of the second control signal in response to a received duty cycle signal.

10. The transmitter as set forth in claim 1, wherein the first and second power control signals are periodic.

11. The transmitter as set forth in claim 1, implemented in form of a chip mounted on a radio frequency board, wherein the radio frequency board does not comprise a dedicated heat dissipating element.

12. The transmitter as set forth in claim 1, wherein the power amplifier and the heating element are arranged adjacent to each other, or in an overlapping manner, or in an interlaced manner.

13. The transmitter as set forth in claim 1, wherein the heating element comprises a dummy power amplifier.

14. A method of operating a transmitter, comprising generating an oscillatory low power signal;

generating a high power signal according to the low power signal, using a power amplifier;

operating a heating element such that a heat production rate of the group consisting of the power amplifier and the heating element remains substantially constant; and providing a first power control signal to the power amplifier and a second power control signal to the heating element.

15. The method of claim 14 further comprising:

delaying the first and second power control signal relative to each other.

16. The method of Claim 14 further comprising:

setting a duty cycle of the first control signal and a corresponding duty cycle of the second control signal in response to a received duty cycle signal.

17. The method of claim 14 wherein the first and second power control signals are periodic.

18. A transmitter, comprising an oscillator to generate an oscillatory low power signal;

a power amplifier to generate a high power signal according to the low power signal;

a heating element to produce heat to compensate for variations in heat produced by the power amplifier, wherein a heat production rate of the group consisting of the power amplifier and the heating element is substantially constant based on the heating element compensating for variations in the heat produced by the power amplifier; and a controller configured to provide a first power control signal to the power amplifier and a second power control signal to the heating element.

19. The transmitter as set forth in claim 18, wherein the first and second power control signals are complementary to each other.

20. The transmitter as set forth in claim 18, wherein the heating element comprises a dummy power amplifier.

\* \* \* \* \*